(No Model.) 8 Sheets—Sheet 1.

J. N. ERICSSON.
GRAVITY MOTOR.

No. 573,583. Patented Dec. 22, 1896.

FIG. I.

WITNESSES:
Sew. E. Curtis
H. W. Munday.

INVENTOR:
JOHN N ERICSSON
By Munday, Evarts & Adcock.
HIS ATTORNEYS.

(No Model.) 8 Sheets—Sheet 4.

J. N. ERICSSON.
GRAVITY MOTOR.

No. 573,583. Patented Dec. 22, 1896.

WITNESSES:
Sew. E. Curtis
H. W. Munday

INVENTOR:
JOHN N. ERICSSON
By Munday, Evarts & Adcock,
HIS ATTORNEYS.

(No Model.) 8 Sheets—Sheet 5.
J. N. ERICSSON.
GRAVITY MOTOR.
No. 573,583. Patented Dec. 22, 1896.

WITNESSES:
Sew. E. Curts
A. W. Munday

INVENTOR:
JOHN N. ERICSSON
By Munday, Evarts & Adcock.
HIS ATTORNEYS.

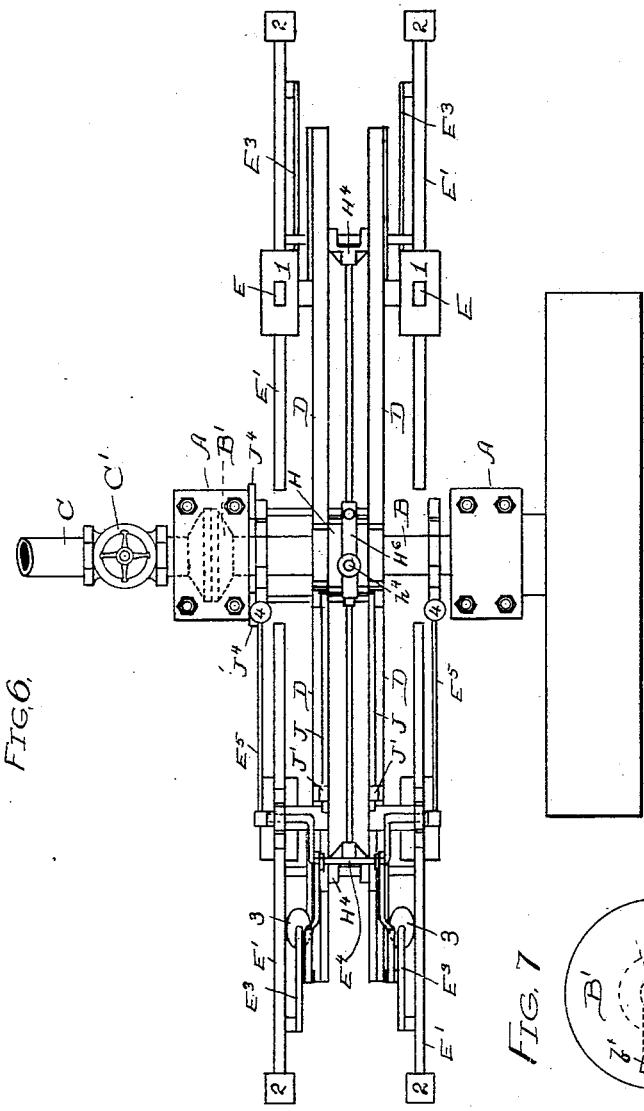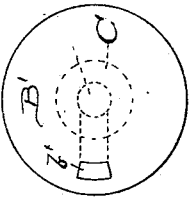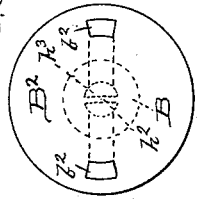

(No Model.) 8 Sheets—Sheet 7.
J. N. ERICSSON.
GRAVITY MOTOR.
No. 573,583. Patented Dec. 22, 1896.
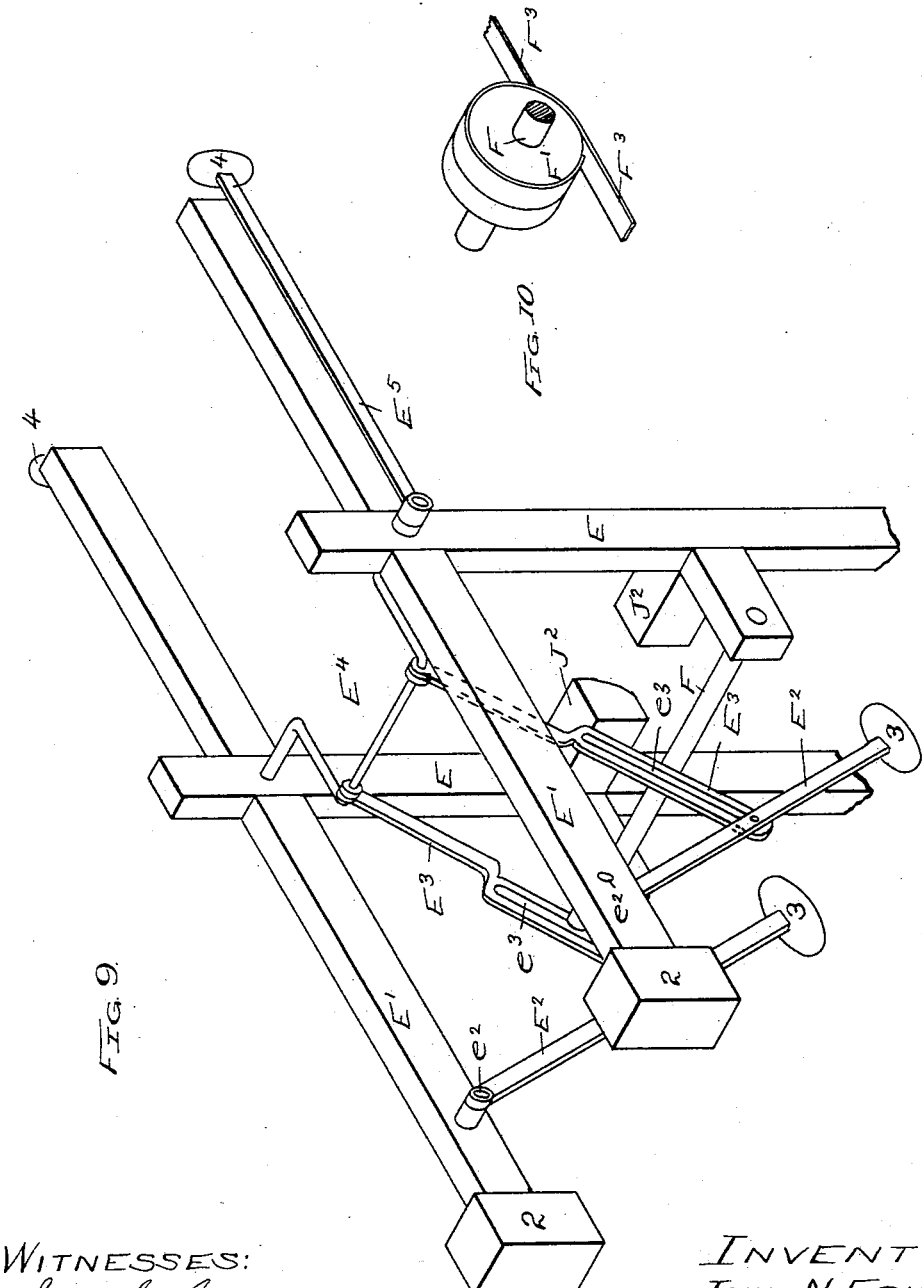
WITNESSES:
INVENTOR:
JOHN N ERICSSON.
BY Munday, Evarts & Adcock.
HIS ATTORNEYS.

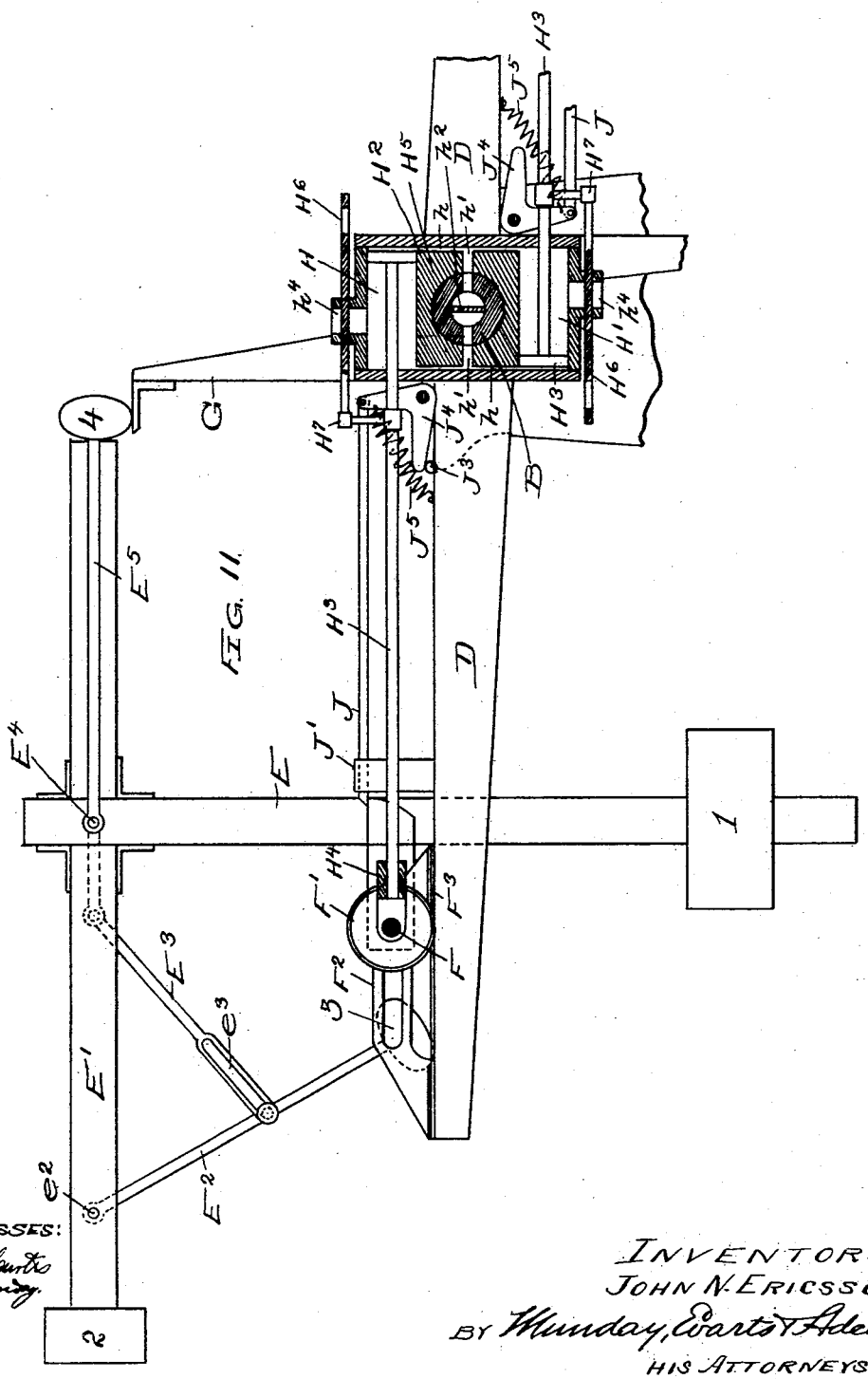

UNITED STATES PATENT OFFICE.

JOHN N. ERICSSON, OF CHICAGO, ILLINOIS.

GRAVITY-MOTOR.

SPECIFICATION forming part of Letters Patent No. 573,583, dated December 22, 1896.

Application filed January 25, 1895. Serial No. 536,170. (No model.)

*To all whom it may concern:*

Be it known that I, JOHN N. ERICSSON, a citizen of the United States, residing in Chicago, in the county of Cook and State of Illinois, have invented a new and useful Improvement in Gravity-Motors, of which the following is a specification.

This invention relates to the construction of a gravity-motor in which I employ a rotary wheel or frame the arms of which radiate in opposite directions from the axis and are furnished with weights capable of being shifted from and toward the axis to lighten the load when they are swung upward and to increase the load when they are swung downward.

The invention consists in the combination, with such a wheel or frame and its weights, of automatic means for thus shifting the weights at proper times to insure the best results in motive power.

Figure 1:
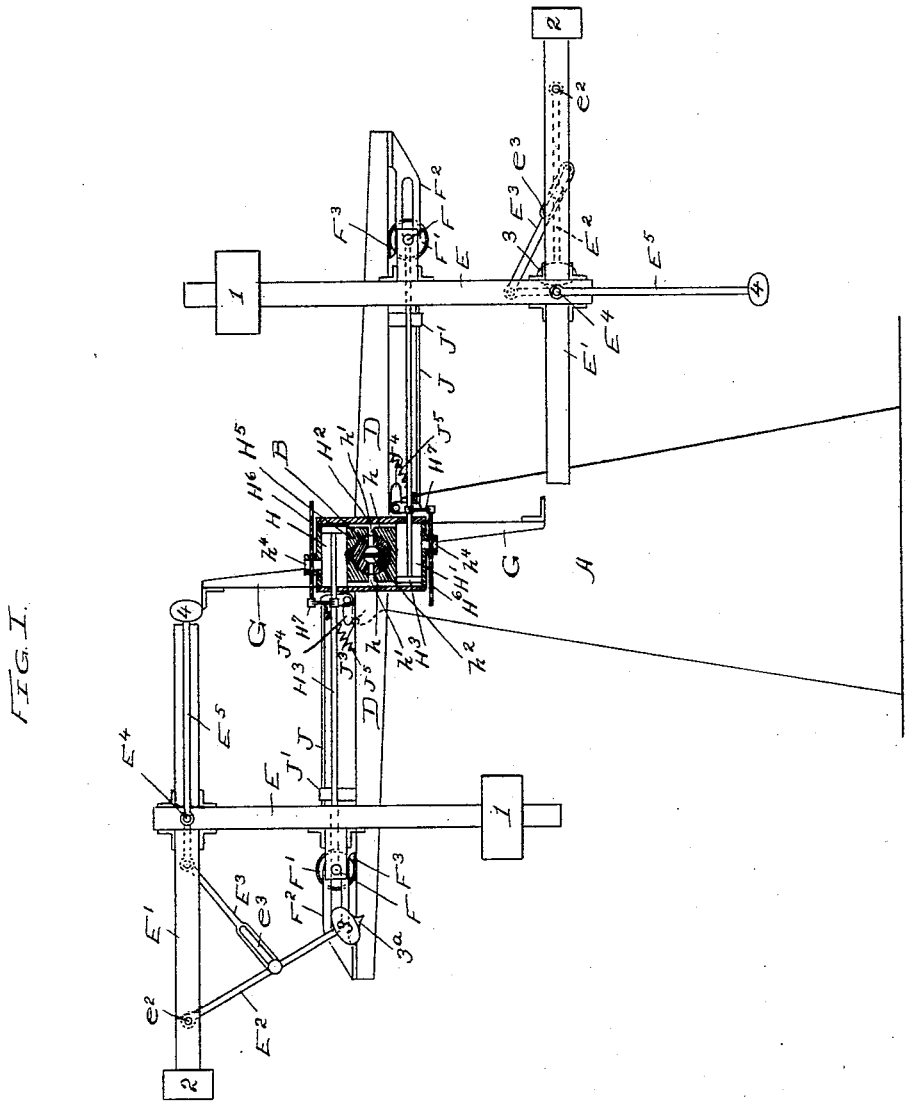
Figure 2:
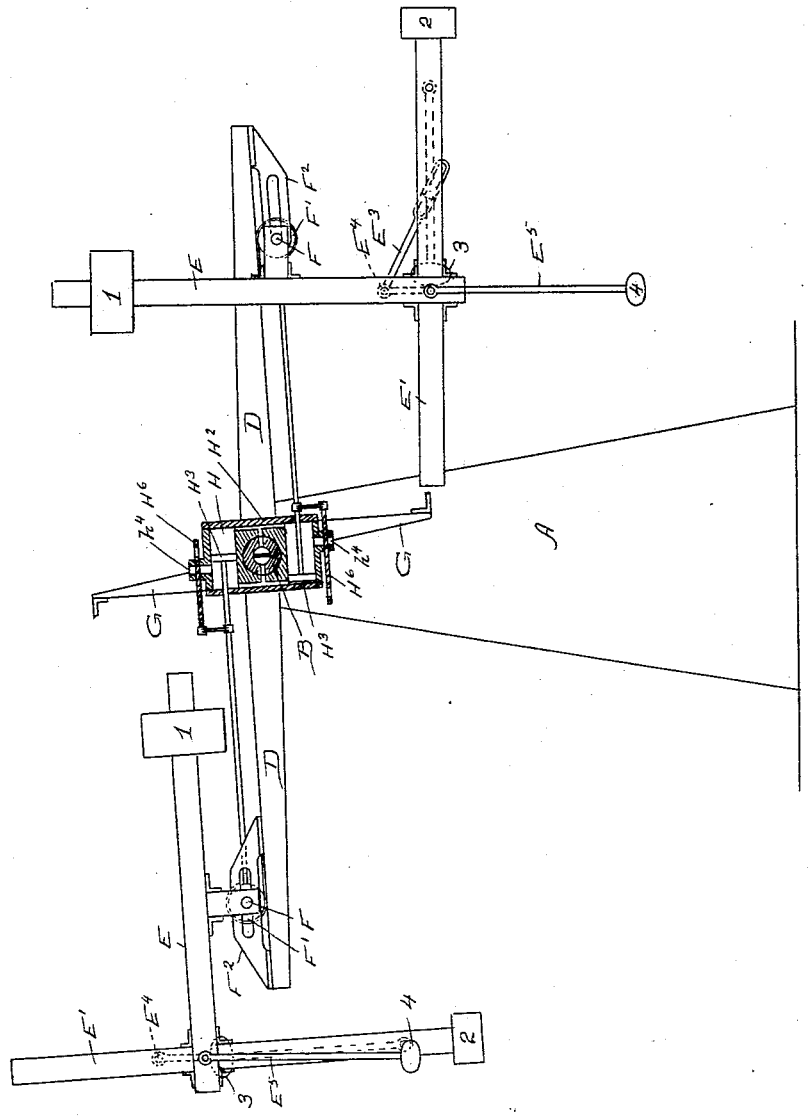
Figure 3:
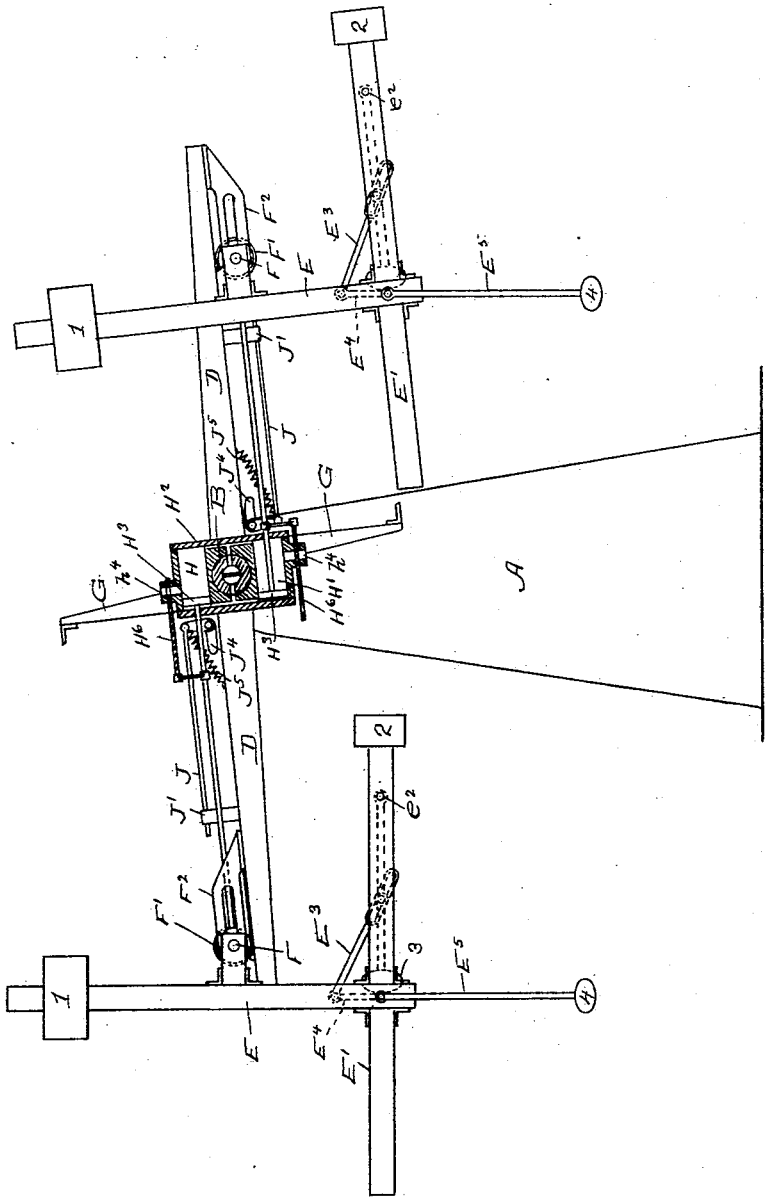

In the accompanying drawings, forming a part of this specification, and in which similar letters and numerals of reference indicate like parts, Figure 1 is a vertical section of my improved motor. Figs. 2, 3, 4, and 5 are similar sections showing the parts in different positions assumed by them during a revolution of the motor-frame. Fig. 6 is a plan of the motor. Figs. 7 and 8 are details of the steam-valve. Fig. 9 is a partial perspective of the weight-carrying crosses or frames mounted upon the arms of the main or rotating frame. Fig. 10 is a detail in perspective of the pulley and belts for oscillating the frames shown in Fig. 9. Fig. 11 is an enlarged sectional view showing the parts in the position given in Fig. 1.

In the drawings, A A represent suitable standards for supporting the motor. Upon these standards is a hollow shaft B, connected at its end to a steam-supply pipe C, provided with the globe-valve C', adapted to shut off the supply absolutely or to regulate the amount of steam used. Radiating from opposite sides of the shaft are pairs of arms D, carrying the motor-weights. The latter are preferably made in pairs and supported from the arms D by pairs of T-shaped frames, or "crosses," as they may be appropriately termed. The crosses are each composed of the members E and E', secured together, preferably at right angles, and each pair of companion crosses is mounted upon a rock-shaft F, carrying the pulleys F' and having its ends confined in the slots in keepers F², fast upon the main arms D. The weights are shown at 1 1, 2 2, 3 3, and 4 4. They are graduated in heaviness, the weights 1 being the largest and the others successively diminishing therefrom, and I prefer that the several sizes be made twelve pounds, three pounds, two pounds, and one pound, respectively, or in that proportion. The weights 1 are stationarily secured upon the members E of the crosses and the weights 2 in like manner upon the ends of members E'. The weights 3 are secured to the free ends of swinging arms E², pivoted at $e^2$ to the arms E', and said arms E² are controlled by levers E³, pivotally mounted upon a cranked shaft E⁴, journaled at its ends in the crosses, the levers E³ being slotted, as shown, and the studs $e^3$, secured to the arms E², passing through the slots. The weights 4 are secured to the outer ends of arms E⁵, rigidly attached to the ends of the cranked shaft. It will be seen from this construction that weights 4, through arms E⁵, may operate the cranked shaft and that the latter, through the slotted levers E³, will determine the positions of weights 3. Said weights 3 have projections $3^a$, which at times rest against the shafts E⁴.

Rests G, projecting from the hub or shaft, are provided upon opposite sides of the latter, whose office it is to support weights 4 when the latter are in their uppermost position.

In order to obtain the proper action of the weights, I shift the crosses toward and from the axis at proper times, and also oscillate them automatically by means of the pulleys F' upon the rock-shafts F and the pairs of belts F³, winding in opposite directions upon the pulleys, each belt having one of its ends secured to the arms D at opposite sides of the pulley, and an engine or motor upon the shaft B, connected to shafts F and adapted to force them toward and from the shaft B. This motor is preferably a multiple-cylinder steam-engine, having its cylinders H and H' formed in the casing H² and located at opposite sides of the supporting-shaft B, and also having its pistons H³, connected each to a cross-head H⁴, encircling one of the rock-shafts F. The cylinders communicate with each other by means of the end steam-passages $h$, and radial passages $h'$ extend through the opposite walls of the shaft B and through the hub H⁵, encircling the shaft within the casing, and open communication between the passages $h$ and the steam-supply. The interior of the shaft is divided by a partition $h^2$, thus forming two passages $h^3$, each of which is open to one of the radial passages $h'$. Outlet-ports $h^4$ are provided for the cylinders and are controlled by sliding valves H⁶, joined to the piston-rods by arms H⁷, the valves being adapted to open their respective ports when the pistons reach the end of their outward stroke. For controlling the admission of the steam to the interior passages $h^3$ a flat-faced disk B' is attached to the steam-pipe C and provided with a steam-passage $b'$, leading outwardly from the steam-pipe and open at the flat side of the disk, as seen at Fig. 7, and a companion and similar disk B² is applied to the end of shaft B, this latter disk having two steam-passages $b^2$, each leading inwardly from the flat side of the disk to one of the axial passages $h^3$. The ports $b'$ and $b^2$ are brought in register momentarily by the rotation of the shaft B, and steam is at such times admitted to the passages $h^3$.

For the purpose of locking the pistons against moving under the steam-pressure, except when such movement is desired, I provide each of the arms D with a sliding lever J, supported near its outer end in a guide-block J' and adapted to set over the projection, stud, or point J² upon the corresponding cross. As this stud is located at some distance from the center upon which the cross is supported from the arms D this engagement of the lever with the stud will prevent any swinging movement by the cross. The engagement is released and the lock broken at proper times by the contact with a pin J³, located upon one of the standards A, with one of the arms of the elbow-lever J⁴, having its other arm joined to lever J. The levers J⁴ are pivoted upon the arms D. The springs J⁵ keep the levers J⁴ in their normal positions.

Figure 4:
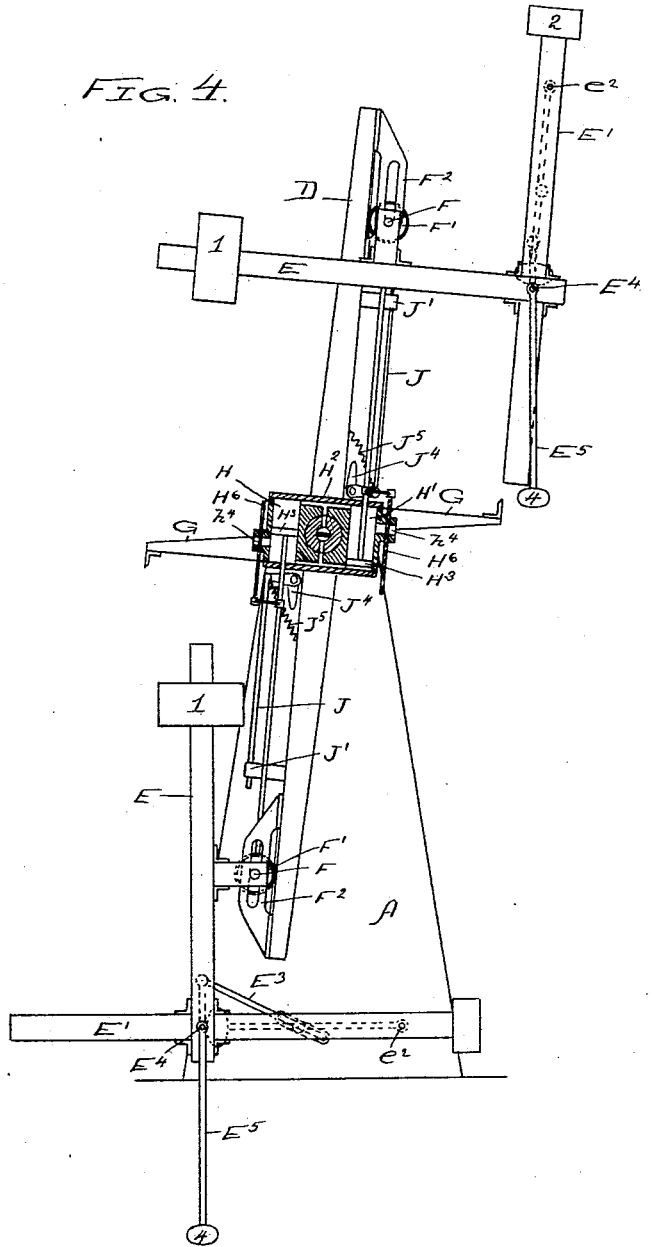
Figure 5:
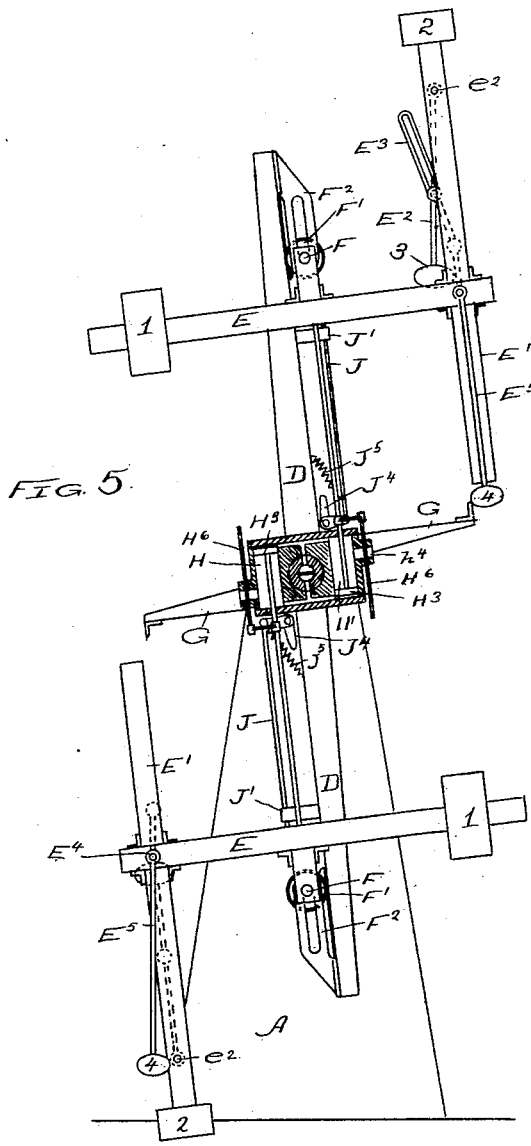

With this construction the operation is substantially as follows: Supposing the motor to be swung toward the left and that the parts have arrived at the position shown in Fig. 1, in which the cross at the left of the figure is just being released from its locking-levers J, the weight 4 is supported upon rest G, and the already-used steam in the lower cylinder is free to enter the upper cylinder and to force the piston thereof in the direction which will carry the cross shifted by it away from the axis. By the time the motor has moved to the position given at Fig. 2 the cross will have swung on its axis F as there indicated and the shifting weights will also have assumed the positions shown. The expanding steam also will have carried the cross outward a portion of the distance permitted in the shifting operation. Little change has in the meanwhile taken place in the cross at the right of the figure from that shown in Fig. 1, inasmuch as it is locked during this portion of the revolution. A slight further rotation brings the parts to the position shown at Fig. 3, the first-mentioned cross having then turned through another quarter-revolution on its own axis and having been shifted still further outward from the main axis. The movement of the upper piston has now carried the valve controlling the outlet of its cylinder far enough to open said outlet, so that the steam is free to pass out. This additional rotation likewise produces but little change in the other cross, which is still locked. In Fig. 4 the parts have moved so that the crosses are nearly vertical with respect to each other, and in the interval between the previous position and this one live steam will have been admitted to the lowermost axial passage $h^3$ and will have carried the piston already mentioned back toward the starting-point, thereby closing the steam-outlet and lifting the cross toward the main axis. In this position of course the weights are nearly neutral, and the lifting by the piston is nearly in a vertical line, and hence I employ the live steam for this service. (The outward shifting requires less power and may therefore be done by the second expansion of the steam from one cylinder into the other.) The uppermost cross in this figure is still locked against swinging, and hence no change takes place in it, except the swinging of the weight 4, the weight 3 being still in the relative position shown in Figs. 2 and 3. In Fig. 5 the parts have passed to a position slightly beyond the vertical and the lower cross has again assumed the same position relative to its supporting-arms D which it occupied in Fig. 1, and it is again locked, it having now been again brought inward toward the main axis to the full extent permitted, this operation carrying the locking-studs J² under the levers J. The steam by which the cross was shifted is now free to expand into the other cylinder, and will move the piston of that cylinder whenever the lock upon the cross which it operates is released, so as to give freedom for the shifting movement. In the position shown in Fig. 5 it will be seen that the weight 4 of the upper cross is lying against the rest G and that the weight 3 has begun to swing from the position shown in the other figures toward that shown in Fig. 1 in the case of the other cross. A quarter-revolution or thereabout from the position given at Fig. 5 will bring the parts to the position given at Fig. 1, with the exception that the crosses will have changed places.

In the rotation of the motor it will be seen that the greater weight and consequent power will be with the weights which are moving downward, so that considerable power is created. It will also be seen that by mounting the weights upon the crosses and manipulating the latter, as described, the shifting operation is assisted.

While I have shown only two pairs of weight-carrying arms at opposite sides of the axis, it will be obvious that the number may be increased to any extent permitted by the size of the wheel or frame. Ordinarily a greater number than two will be used. The steam-cylinders H and H' are preferably exactly alike both in construction and dimension, and they alternate with each other in operating, one being still while the other is acting.

I claim—

1. The combination with a rotating wheel, frame or arms and weights, mounted thereon and adapted to shift toward and from the axis of the wheel, frame or arms, of automatic means for shifting the weights actuated independently of the wheel, substantially as specified.

2. The combination with a rotating wheel, frame or arms and weights mounted thereon and adapted to shift toward and from the axis of the wheel, frame or arms, of a steam-motor located at the axis and adapted to effect the shifting of the weights, substantially as specified.

3. The combination with a rotating wheel, frame or arms and weights mounted thereon and adapted to shift toward and from the axis of the wheel, frame or arms, of a shaft supporting the wheel, frame or arms and provided with axial passages $h^3$, a motor for effecting the shifting of the weights, mounted upon said shaft and receiving its supply of steam from said passages $h^3$ and connections between said motor and the weights, substantially as specified.

4. The combination with the rotating arms as D, and shifting weights mounted thereon, of a supporting-shaft having axial steam-passages, and steam-cylinders connected each with one of said passages, and also having connecting-passages at their ends whereby the once-used steam in each cylinder may expand into the other cylinder, the pistons of said cylinders being connected to and effecting the shifting of the weights, substantially as specified.

5. The combination with the rotating arms as D, and shifting weights mounted thereon, of a steam-cylinder for each of said arms, having its piston connected to the shifting weights, said cylinders being also connected together by passages so that the once-used steam in each may expand into the other, substantially as specified.

6. The combination with rotating arms or frame D of crosses adapted to swing on the arms or frame and to be shifted toward and from the axis about which the arms or frame revolve, means for shifting said crosses and weights mounted on said crosses, substantially as specified.

7. The combination with rotating arms or frame D of crosses adapted to swing on the arms or frame and to be shifted toward and from the axis about which said arms or frame revolve, means for shifting said crosses and weights attached to said crosses, said crosses being also provided with means whereby they may be locked against swinging during a portion of the revolution of the arms or frame, substantially as specified.

8. The combination with rotating arms or frame D of crosses adapted to swing on the arms or frame and to be shifted toward and from the axis about which said arms or frame revolve, means for shifting said crosses and weights 1, 2, 3 and 4 mounted on the crosses, substantially as specified.

9. The combination with rotating arms or frame D of crosses adapted to swing on the arms or frame and to be shifted toward and from the axis about which said arms or frame revolve, means for shifting said crosses and weights 1, 2, 3 and 4 mounted on the crosses, said crosses being also provided with means whereby they may be locked against swinging during a portion of the revolution of the arms or frame, substantially as specified.

10. The combination with rotating arms or frame D, of crosses adapted to swing on the arms or frame and to be shifted toward and from the axis about which the arms or frame revolve, means for shifting said crosses and weights, some of which are fast upon the crosses and some of which are movably attached thereto, substantially as specified.

11. The combination in a gravity-motor of the rotating arms or frame, the swinging crosses borne by said arms, the swinging weights 4 attached to the crosses, and the rests G rotating with the arms and positioned to sustain said weights during a portion of the revolution, substantially as specified.

12. The combination of two similar cylinders H and H', and their pistons, said cylinders having communicating passages at their ends, so that the steam in each may expand into the other, and also having separate inlet and outlet passages, and means for alternately locking the pistons of said cylinders against movement, substantially as specified.

JOHN N. ERICSSON.

Witnesses:
H. M. MUNDAY,
L. E. CURTIS.